United States Patent [19]

Adrian

[11] 4,338,003
[45] Jul. 6, 1982

[54] ANTI-GLARE SPECTACLES

[76] Inventor: Werner Adrian, 301 Shakespeare Dr., Waterloo, Ontario, Canada, N2L 2T9

[21] Appl. No.: 168,546

[22] Filed: Jul. 14, 1980

[51] Int. Cl.³ .......................... G02C 7/10; G02C 7/16
[52] U.S. Cl. ...................................... 351/45; 351/44
[58] Field of Search ...................... 351/44, 45, 46, 47, 351/48

[56] References Cited

U.S. PATENT DOCUMENTS 1,637,406  4/1927  Brumder .
3,512,880  5/1970  Alexander et al. .................. 351/45

Primary Examiner—John K. Corbin
Assistant Examiner—Rodney Bovernick
Attorney, Agent, or Firm—Colton & Stone, Inc.

[57] ABSTRACT

In anti-glare spectacles comprising a frame and a pair of lenses, each lens comprises a substantially circular central zone of substantially complete transparency and an adjoining light-absorbing annular zone over an angular range of substantially 45° in which the light absorption increases sharply from the inside of the annulus and drops towards the outside of the annulus by the square of the angle. An outer zone of each lens has a low absorption.

9 Claims, 4 Drawing Figures

ANTI-GLARE SPECTACLES

The invention relates to anti-glare spectacles or glasses comprising a conventional frame and lenses held therein to be centralised with the pupils, the lenses exhibiting a different transparency of absorption over their area.

Anti-glare spectacles of this kind are known and numerous embodiments are offered primarily to motorists. In the case of the known anti-glare spectacles for motorists, the lenses are tinted at the centre and top and completely transparent in their lower regions. There can be a gradual transition from complete transparency in the lower region to complete absorption at the top. When wearing these spectacles, the motorist moves his head downwardly when experiencing glare by the headlights of an oncoming vehicle and hence cannot see objects in front of him. The beams from the headlights thereby strike zones of ever increasing absorption so that the glare light intensity at the eye $E_{B1}$ is reduced. When wearing such spectacles, the motorist must constantly raise and lower his head. In another known type of anti-glare spectacles for motorists, the lenses are strongly tinted at one side and towards the other side they have a decreasing tint. On the whole, the tinting in one lens extends over about half the total width of the lens and in the other lens about one third. The arrangement of these different zones of complete transparency on the left-hand or right-hand lens and the arrangement of the tinted regions on the one side or the other side of the lenses depends on whether the anti-glare spectacles are to be worn by motorists in countries having left-hand or right-hand traffic (U.S. Pat. No. 3,512,880). When wearing these spectacles, the motorist must constantly shake his head to the left and right. On one side, these spectacles give the motorist an unhindered peripheral view. For this reason street lanterns, which also can cause glare, are not covered. Generally speaking, the biggest disadvantage of the known anti-glare spectacles resides in the fact that objects which ought to be seen also fall into the absorption zone but this should be avoided on all accounts.

Physiological glare reduces the perceptability of the eye and occurs if one or more glaring lights are disposed in the field of view or if the field of view itself has a high luminance. The detrimental influence is caused by stray light which is created when light beams pass through the eye media, primarily in the cornea, the non-homogeneously structured lens of the eye and in the retinal layers themselves. The lens of the eye changes with an increase in age, which leads to a reduction in the width of accomodation and to more formation of stray light. Older persons are therefore more sensitive to glare than are younger people.

The reduction in the perceptability of the eye under glare is caused by the fact that the image of the object to be viewed and that is always formed at the centre of the retina, the fovea centralis, has a haze of stray light superimposed on it whereby the contrast of this image is reduced.

The casual relationships of physiological glare have often been investigated and discussed in publications. Glare is stated to be expressed by a uniform field surrounding the viewed object having a luminance that requires the same threshold value of the viewed object as under glare. This surrounding field luminance is equivalent to the effect of stray-light created in the eye and is termed equivalent stray-light luminance $L_{säq}$. The relationship is given numerically by the formula:

$$L_{säq} = K \cdot E_{B1}/\theta^2 \qquad \text{(Equation 1)}$$

wherein $L_{säq}$ is in cd/m$^2$,

K is an age-dependent constant amount to about 10 for the age group between 20 and 30, $E_{B1}$ is the illuminance in Lx produced by the source of glare in the plane of the eye normal to the direction of viewing, and $\theta$ is the angle between the viewed object and the centre of the source of glare in degrees.

With several sources of glare in the field of view, the individual proportions of stray light are superimposed according to the formula:

$$L_{säq\,ges.} = K \sum_{i=1}^{n} \frac{E_{B1i}}{\theta_i^2} \qquad \text{(Equation 2)}$$

The exponent of $\theta$ applies only for $\theta \geq 2°$.

Equation 2 experimentally proves that the stray light calculation is also applicable to any desired surrounding fields, and thus the surrounding can be considered as being made up from small light sources and disposed around a central field of about 2° diameter. It has been found that a bright surrounding field reduces the contrast of a foveally viewed object, which leads to an increase of its threshold. This detrimental influence in viewing can be eliminated if one reduces the luminance of the source of glare in the field of view and thus the amount of the stray light created in the eye media.

The present invention is based on these considerations and leads to anti-glare spectacles in which the absorptions of the lenses are designed according to physiological considerations. Accordingly, it is an object of the present invention to provide anti-glare spectacles constructed so that the equivalent stray-light luminance $L_{säq}$ over the entire field of view becomes constant. The wearer of these spectacles will then be confronted with adsorbing zones only at places where sources of glare appear in the field of view and experience not the hazardous effect on the ability to view the street in front of him.

In spectacles of the aforementioned kind, this object is achieved in accordance with the invention with the aid of the features in the appended claims. The spectacles are suitable for wearing at a place of work where glare might occur because of reflections or bright surfaces around the viewed object on the work surface, as well as for motorists. In the latter case, a desirable feature is that each lens includes a completely transparent lower zone bounded by a horizontal line and a line subtending an angle of about 50° with the vertical. In general, no glare sources occur in this region of the field of view from oncoming vehicles. In this very important part of the field of view for observing traffic, the spectacles therefore retain their full transparency.

The invention therefore utilizes the relationships given in Equations 1 and 2 in order to reduce glare from light sources such as is encountered in traffic at night. A lens placed in front of the eye is optically constructed so that it has very little light absorption in a central zone of the visual field, i.e. the place where fixed objects are perceived. The user of the spectacles according to the invention is therefore always left with a central zone in which he has full visibility. Following this central transparent zone, the absorption of the lens increases sharply until it reaches a maximum of 0.8 to 0.85 approximately 7.5° from the centre in order to reduce the intensity of glare occurring particularly in this zone through the headlights of oncoming vehicles, which leads to a reduction in the formation of stray-light. The angles stated relate to a spacing of the lens from the nodal point of the eyes of 26 mm. The absorption is then reduced again with a gradient following the law $E_{B1} \cdot \theta^{-2}$, to approach zero at approximately 20° from the centre. This creates a zone of lower absorption at the periphery of the field of view. This feature serves to maintain unhindered peripheral view at night time because the visual information available from the periphery of the field of view is important for traffic safety. The transparent peripheral zone becomes possible because the effect of a source of glare is reduced with the square of the angle $\theta$. With the selected construction of the absorption gradient for the lens following $E_{B1} \cdot \theta^{-2}$ glare remains practically constant when passing an oncoming vehicle. In one form of the invention, the course of the gradient for the light transmission is circular so as similarly to reduce the sources of glare occurring in the upper half of the field of view, for example street lanterns. On the other hand, no sources of glare need to be expected in the lower part of the field of view in which there is an optically transparent zone.

It is a further feature of the invention that the transitions from optically dense to optically thin zones are gradual. It has been found experimentally that the perceptibility of objects in surrounding fields of small sizes increases again, and this cannot be explained by stray-light. Other tests have shown that voluntary eye movements cause a defect in adaptation of the retinal area used for perception through the marginal contrast between the surrounding field and the internal field which is temporarily formed on the fovea. Even if the edge of the clear central zone is sharp adjacent the zone of high absorption, this will not be sharply imaged on the retina because the optical medium is disposed far within the near point of the eye. A detrimental effect would nevertheless become noticeable, especially because of the added effect of involuntary eye movements, so that the line of sight can pass through the lens of the spectacles even near the rim of the central zone. For this reason, the transitions of the absorptions should be gradual as indicated in the accompanying drawings.

The basic construction of the anti-glare spectacles according to the invention is intended for use at work places where the requirements for visibility are high and the generally bright surfaces surrounding the viewed object could reduce its contrast and thus perceptability, for example in surgery. Similarly, glare could be produced from strong light sources or reflections.

Examples of the invention will now be described with reference to the accompanying diagrammatic drawings, wherein.

Figure 1:
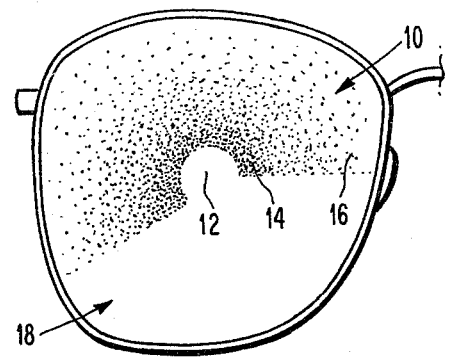
FIG. 1 is a schematic view of anti-glare spectacles showing an embodiment of lens suitable for street traffic.
Figure 2:
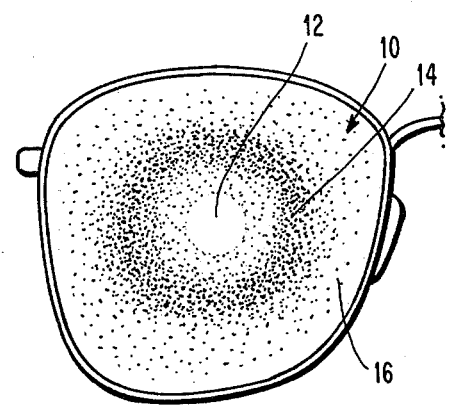
FIG. 2 is a view similar to FIG. 1 of a different embodiment suitable for work places.

In the FIGS. 1 and 2 embodiments, a central zone 12 of the lens 10 is completely transparent. This central zone is adjoined radially by an annular zone 14 of increasing absorption. In the FIG. 1 embodiment, absorption reaches a maximum value of about 0.85 and in the FIG. 2 embodiment a maximum value of about 0.55 to about 0.6. This is followed by a peripheral zone 16 giving complete transmission of light. In the FIG. 1 embodiment which is intended for a motorist, a sector 18 at the bottom right-hand portion of the lens is completely transparent. The FIG. 2 embodiment intended for workplaces shows a strictly circular construction without any transparent lower zone. In this case the maximum absorption is 0.5 to 0.55 so that the objects occurring around the absorption zone are not excessively weakened and the field of view will not appear excessively non-homogeneous. Calculations show that in a homogeneous surrounding field a reduction in stray-light by about 15% is achieved with the spectacles according to FIG. 2.

Figure 3:
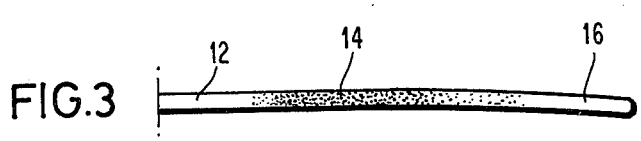
FIG. 3 is a diagram indicating the course of transmission or absorption as viewed over the width of a lens.
Figure 4:
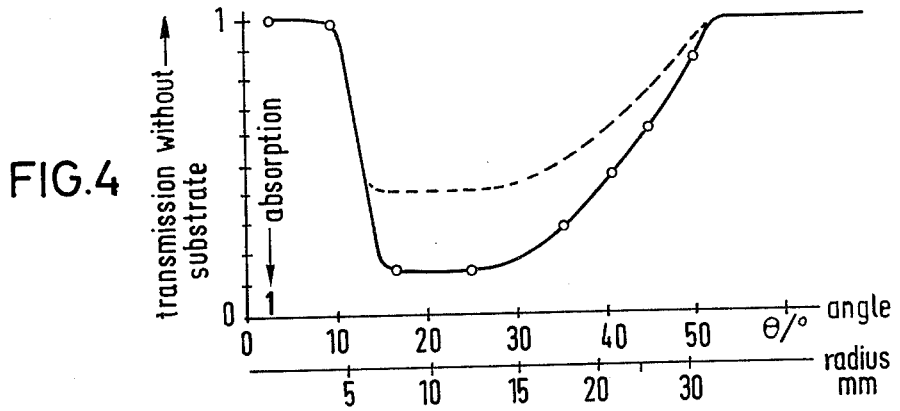
FIG. 4 is a graphical representation of the transmission or absorption.

The course of transmission or absorption over the width or radius of a lens is shown in FIGS. 3 and 4. In FIG. 4, the transmission (upwardly along the ordinate) or absorption (downwardly along the ordinate) is plotted against the angle $\theta$ in degrees or against the radius in mm, curve 1 representing spectacles for use at night-time and curve 2 spectacles for use in daylight. Without considering the absorption occurring through the glass itself or the substrate, both FIGS. 3 and 4 show that there is full transmission of light in the central zone over an angle of about 11° or 5 mm. This is followed by a zone of increasing absorption from about 5 to about 7.5–8 mm. The rise is practically linear. There is then a zone of constant absorption. $E_{B1}$, which is the intensity of illumination produced at the eye by a passing automobile, is in this case substantially constant. After about 15 mm, absorption then drops off proportionally to $\theta^2$. Here, $E_{B1}$ remains practically constant. The light absorbing zone thus extends over an annular range of substantially 45°. At the periphery, there is again complete transmission of light.

I claim:

1. Anti-glare spectacles comprising a frame and lenses, wherein each lens comprises a substantially circular central zone of substantially complete transparency, an adjacent light-absorbing annular zone over an angular range of substantially 45° in which the absorption increases sharply from the inside of the annulus and drops towards the periphery by the square of the angle, said angle being that between the viewed object and the center of the source of glare, and an outer zone having a low absorption.

2. The spectacles of claim 1, wherein the lenses serve for the purpose of optical eye correction.

3. The spectacles of claim 1, wherein each lens includes a completely transparent lower zone bounded by a horizontal line and a line subtending an angle of about 50° with the vertical.

4. The spectacles of claim 3, wherein said completely transparent lower zone is disposed to one or the other side of the lens depending on whether the spectacles are to be worn by motorists in countries with left-hand or right-hand traffic.

5. The spectacles of claim 1, wherein said central zone covers half an aperture angle of about 11°.

6. The spectacles of claim 1, wherein the absorption in said annular zone reaches a maximum of $\tau =$ about 0.8 to 0.85.

7. The spectacles of claim 1, wherein every transition from an absorbing zone to a transparent zone is gradual.

8. The spectacles of claim 1, wherein the absorption in said annular zone is a maximum of $\tau = 0.5$ to $0.55$ for use in daylight.

9. The spectacles of claim 1, wherein the absorption in said annular zone increases linearly in a region of about 5 to 7.5-8 mm, thereafter remain substantially constant up to about 15 mm and after 15 mm is substantially proportional to $\theta^2$.

* * * * *